UNITED STATES PATENT OFFICE.

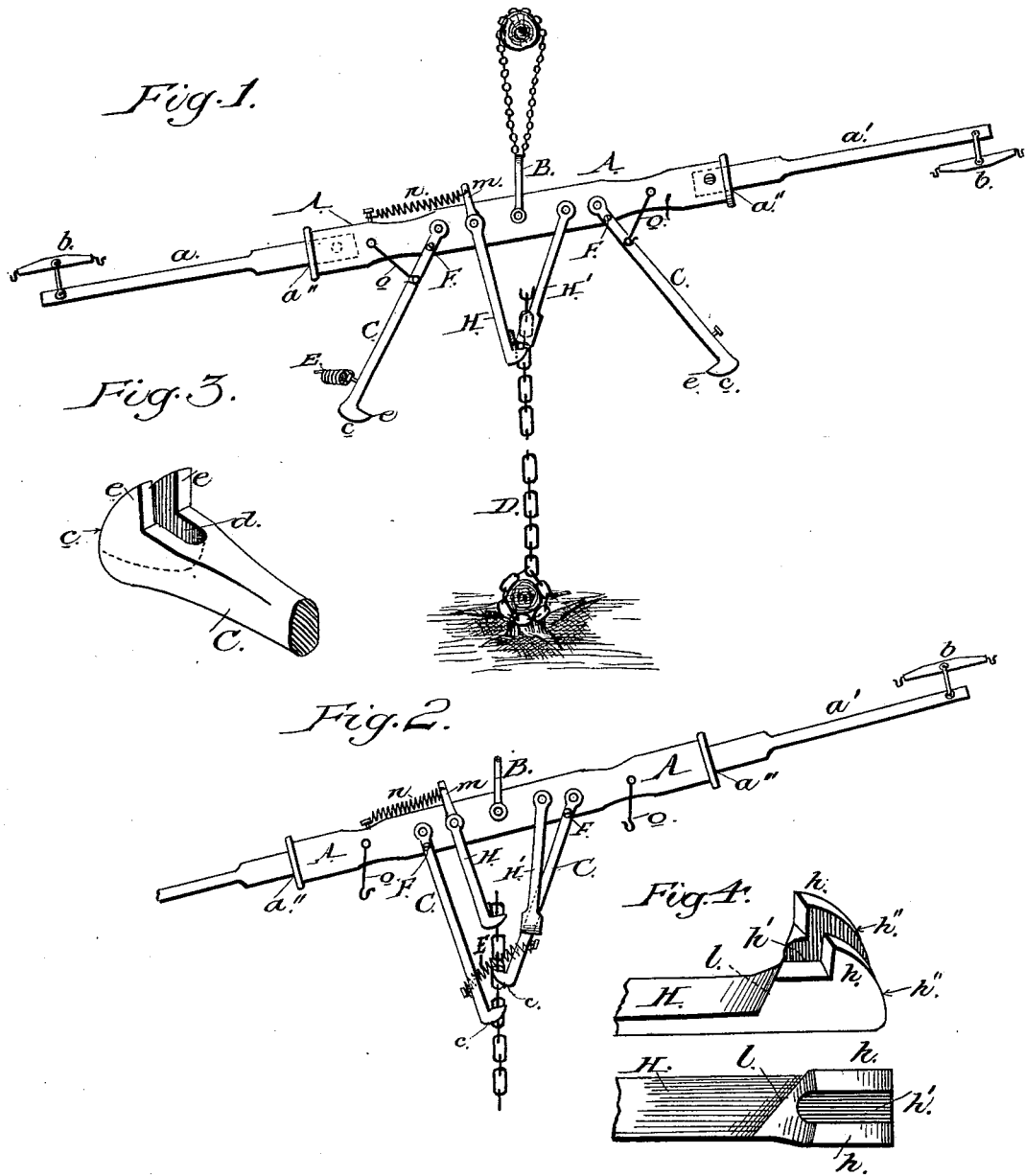

HENRY C. BELL, OF UNION CITY, TENNESSEE.

STUMP-EXTRACTOR.

SPECIFICATION forming part of Letters Patent No. 386,957, dated July 31, 1888.

Application filed December 20, 1887. Serial No. 258,433. (No model.)

*To all whom it may concern:*

Be it known that I, HENRY C. BELL, a citizen of the United States, residing at Union City, in the county of Obion and State of Tennessee, have invented certain new and useful Improvements in Stump-Extractors, of which the following is a full and clear description, reference being had to the accompanying drawings, forming part of this specification, in which—

Figures 1 and 2 represent plan views of my apparatus, showing the manner of operating the same. Figs. 3 and 4 are details of one end of one of the links C and H.

My invention relates to the class of stump-extractors; and it consists in the constructions and combinations of devices, which I shall hereinafter fully describe and claim.

To enable others skilled in the art to make and use my invention, I will now describe the same and indicate the manner in which I carry it out.

In the said drawings, A represents a bar or head pivoted at its center to a clevis or other coupling device, B, which is secured to a tree or other fixed anchor, as shown. The bar or head A is provided with outwardly-extending arms $a$ $a'$, the latter or both, if necessary, being preferably secured in a socket, $a''$, on one or both ends of the head or bar, so that one of said arms may be readily removed when the space within which the apparatus operates is so limited as to interfere with its movements. Each of the arms or extensions $a$ $a'$ has attached to it on opposite sides a singletree, $b$, or other device, to which a team may be attached.

Upon each side of the central pivot, B, one end of pawls C is pivotally secured, said pawls having hooked outer ends, $c$, inwardly turned and longitudinally slotted at $d$, whereby two lugs, $e$, are formed upon each hooked end to securely confine the links of the chain D. This chain or cable is securely fastened to the article or structure to be moved and its free end passed forward and placed between the hooked ends of the pawls C C, so that one of the links will lie in the groove between the lugs $e$, while the ends of the link immediately in front of said first-named link will rest against the front walls of the lugs, as shown in Fig. 2.

The pawls C C are held together by the spring E, and their outer faces are curved to readily permit the passage of one past the other, as I will indicate. In operating this part of my apparatus the pawls C C, upon the movement of the centrally-pivoted head or bar A, will draw upon one of said pawls, thus pulling the chain forward, while the same movement forces the other pawl rearward, its curved head slipping past the links of the chain and the head of the other pawl until its lugs $e$ engage the second link of the chain in the rear of the link held by the forward pawl, the link contiguous to and in the rear of the one thus engaged being received in the groove in the head of the pawl, as before stated. Each oscillation of the head or bar A therefore causes one pawl to pull upon the chain and the other pawl to move backward to take hold of another link before the first pawl is released from its grip upon its link.

If the hooked ends of the pawls at any time need vertical adjustment to bring them into proper position for grasping the links of the chain, the result may be obtained by adjusting the screws F, which pass through the pawls and bear against the upper surface of the head or bar A.

In addition to the features before noted, I employ in the construction of my apparatus other pawls, H H', which are pivoted to the head or bar A at points between the pawls C C and the pivotal center of said head. The pawls H H' are shorter than the pawls C C, and are provided with hooked ends having lugs $h$ $h$ and grooves $h'$ for the links of the chain, and curved faces $h''$. These pawls are so arranged that the hooked end of one stands at right angles with that of the other, and each is provided with an inclined projection, $l$, located forward of the lugs $h$, and upon these inclines the curved faces of the pawls H H' ride. The pawl H also has a forwardly-extending arm, $m$, to which a spring, $n$, is attached, to keep the hooked end of said pawl against the chain the pawl H' being kept against said chain by its own gravity, it being understood that there is sufficient play at its pivoted end to permit the hooked end to have a vertical movement, whereby said end may readily pass over the head of the adjacent pawl and the links of the chain.

The operation of the pawls H H' is substantially as follows: As the head or bar A is oscillated its movement is transmitted to the pawls H H', whereby one pawl is caused to move forward, pulling upon the chain, while the other pawl is forced backward to obtain a new hold upon the chain. During their opposite movements the curved face of one pawl rides upon the inclined extension of the opposite pawl, whereby a separation of the hooked ends is obtained to permit the passage of one pawl past the other.

When it is desired to use the pawls H H', the long pawls C C are thrown outward and held away from the other pawls and the chain by means of the hooks $o$. In this case the pawls H H' only operate, and, as they are connected to the bar or head A near its pivotal center, increased power is obtained, but at the expense of speed. This will be readily understood when it is stated that the movements of said pawls H H' are such that each successive link of the chain is grasped by one of said pawls, while when operating the device with the pawls C C each second link is grasped. Therefore, when I desire to move an article rapidly, I employ pawls C C, which, as before stated, have a greater movement than the pawls H H'; but if power is required, as when moving a heavy load, pulling stumps, &c., I detach the pawls C C and throw the other pawls H H' into engagement with the chain. If speed and power are desired, I may employ the long pawls C and one short pawl, H or H', the remaining short pawl being held out of the way by any well-known means.

By reason of the construction before described I am enabled to provide a simple and effectual lever-power, which may be applied to many uses—such as pulling stumps, moving structures, pressing hay and cotton, &c.

Having thus described my invention, what I claim as new, and desire to secure by Letters Patent, is—

1. The combination of a centrally-pivoted oscillating head or bar, oppositely-moving pawls H H', the latter having a downwardly-extending hook-shaped head or end at right angles to the head or end of the opposite pawl, a spring attached to said pawl H, and a chain or cable with which said pawls engage, substantially as described.

2. A stump-extractor comprising a centrally-pivoted head or bar, a plural series of pawls connected therewith, so that one member of each series will move in a direction opposite to that of the remaining pawl of the same series, a chain or cable engaged by said pawls, springs for holding the pawls against said chain or cable, and hooks for holding the pawls of one series away from those of the other series, substantially as described.

3. The combination, with an oscillating head or bar, of oppositely-moving pawls having hooked-shaped ends and curved faces, said pawls having also inclined projections upon which the curved faces ride, substantially as herein described.

HENRY C. BELL.

Witnesses:
ROBT. P. WHITESELL,
W. C. TOTOMS.